(12) United States Patent
Liang et al.

(10) Patent No.: US 9,366,242 B2
(45) Date of Patent: Jun. 14, 2016

(54) BIDIRECTIONAL OUTPUT MIXED HYDRAULIC POWER SYSTEM

(71) Applicant: Amtai Medical Equipment, Inc., Raleigh, NC (US)

(72) Inventors: Jyh-Wei Liang, Raleigh, NC (US); Wei-Li Wu, Taichung (TW); Chien-Cheng Su, New Taipei (TW); Wei-Jhe Chen, New Taipei (TW)

(73) Assignee: AMTAI MEDICAL EQUIPMENT, INC., Raleigh, NC (US)

( * ) Notice: Subject to any disclaimer, the term of this patent is extended or adjusted under 35 U.S.C. 154(b) by 4 days.

(21) Appl. No.: 14/507,824

(22) Filed: Oct. 6, 2014

(65) Prior Publication Data
US 2016/0097404 A1    Apr. 7, 2016

(51) Int. Cl.
| | |
|---|---|
| F04B 23/08 | (2006.01) |
| F04B 23/10 | (2006.01) |
| F04B 23/12 | (2006.01) |
| A61G 13/02 | (2006.01) |
| A61G 13/06 | (2006.01) |
| F16K 11/044 | (2006.01) |
| F15B 11/17 | (2006.01) |
| F15D 1/00 | (2006.01) |
| F04B 53/10 | (2006.01) |
| F04B 23/14 | (2006.01) |

(52) U.S. Cl.
CPC ................ *F04B 23/08* (2013.01); *A61G 13/02* (2013.01); *A61G 13/06* (2013.01); *F04B 23/10* (2013.01); *F04B 23/103* (2013.01); *F04B 23/106* (2013.01); *F04B 23/12* (2013.01); *F04B 23/14* (2013.01); *F04B 53/10* (2013.01); *F15B 11/17* (2013.01); *F15D 1/002* (2013.01); *F16K 11/044* (2013.01); *F15B 2211/20576* (2013.01); *Y10T 137/2567* (2015.04); *Y10T 137/2569* (2015.04)

(58) Field of Classification Search
CPC ........ F16K 11/044; F04B 23/08; F04B 23/10; F04B 23/103; F04B 23/106; F04B 23/12; F04B 23/14; A61G 13/02; A61G 13/06; Y10T 137/2567; Y10T 137/2569
See application file for complete search history.

(56) References Cited

U.S. PATENT DOCUMENTS

| | | | | |
|---|---|---|---|---|
| 4,281,677 A | * | 8/1981 | Hoffman | B60T 17/18 137/113 |
| 5,335,926 A | * | 8/1994 | Stolle | B60J 7/1273 296/117 |

* cited by examiner

*Primary Examiner* — Atif Chaudry
(74) *Attorney, Agent, or Firm* — Leong C. Lei

(57) ABSTRACT

The present invention relates to a bidirectional output mixed hydraulic power system, which includes a hydraulic fluid that stores and contains therein a fluid tank; at least one electrical hydraulic pump connected to the fluid tank to draw in, pressurize, and output the hydraulic fluid; at least one mechanical hydraulic pump connected to the fluid tank to draw in, pressurize, and output the hydraulic fluid; at least two sequence check valves each connected to the electrical hydraulic pump and the mechanical hydraulic pump, each of the sequence check valves being set normally open in a first direction and preventing fluid returning in a second direction; and a dual pressure valve that is connected to the fluid tank and each of the sequence check valves for switching output direction of the hydraulic fluid.

8 Claims, 4 Drawing Sheets

BIDIRECTIONAL OUTPUT MIXED HYDRAULIC POWER SYSTEM

BACKGROUND OF THE INVENTION (a) Technical Field of the Invention

The present invention generally relates to a novel bidirectional output mixed hydraulic power system, and more particularly to one that prevents the switching of direction unsmooth due to pressure accumulation in the fluid passage in bidirectional dual power output and thus achieving an effect of bidirectional hydraulic pressure and mixed dual power hydraulic output.

(b) Description of the Prior Art

A conventional hydraulic power output system (shown in FIG. 3) comprises a mechanical hydraulic pump 70, an electrical hydraulic pump 71, a pressure relief valve 72, a check valve 73, and a fluid tank 74. The mechanical hydraulic pump 70 receives manual power as the operation power to draw in, pressurize, and output a hydraulic fluid. The electrical hydraulic pump 71 receives operation power from an electrical motor to draw in, pressurize, and output the hydraulic fluid (output in a single direction). The pressure relief valve 72 functions for relief of pressure when the pressure exceeds a predetermined level. The check valve 73 prevents a returning or reversing flow of the hydraulic fluid. The fluid tank 74 stores and supplies the hydraulic fluid to the pumps so that when the hydraulic power output system is put in operation, outlets of both the mechanical hydraulic pump 70 and the electrical hydraulic pump 71 are provided with check valves 73 to prevent, during the operation of one of the pumps, the hydraulic fluid from flowing reversely in the other one of the pumps so as to achieve mixed power hydraulic output with the two pumps. A drawback is that the mechanical hydraulic pump 70 and the electrical hydraulic pump 71 both have unidirectional hydraulic output, making it not possible to carry out bidirectional hydraulic output.

Another known hydraulic power output system (shown in FIG. 4) comprises a dual pressure valve 80, an electrical hydraulic pump 81, pressure relief valves 82, check valves 83, and a fluid tank 84. When the hydraulic power output system is put in operation, similar to the unidirectional mode of mixed power output, an outlet of the electrical hydraulic pump 81 is operated in combination with the check valve 83 to carry out mixed output of dual powers, which induces pressurization in a first direction. Since the hydraulic fluid is present in the check valve 83, expansion of fluid piping and accumulation of pressure may result and the hydraulic pressure would be kept and accumulated in the fluid piping, making the dual pressure valve 80 of the fluid returning passage pushed rightward, making the pressurization direction changed to pressurization in a second direction, thereby keeping the dual pressure valve 80 normally in an open condition for the fluid returning passage in the second direction. This makes the hydraulic pressure directly return, through the right-side fluid returning passage, back to the fluid tank 84, being unable to achieve pressurization and leading to pressure accumulation to make it impossible to change direction for driving.

SUMMARY OF THE INVENTION

The primary object of the present invention is to make each sequence check valves normally open in a direction toward an electrical hydraulic pump, while preventing fluid returning in a direction toward a mechanical hydraulic pump so as to prevent the occurrence of pressure accumulation, allowing the electrical hydraulic pump to operate for output, whereby when the mechanical hydraulic pump is inputted with operation power, the sequence check valves are active in such a way that fluid returning is made in the direction toward the electrical hydraulic pump so as to prevent the switching of direction unsmooth due to pressure accumulation in the fluid passage in bidirectional dual power output and thus achieving an effect of bidirectional hydraulic pressure and mixed dual power hydraulic output.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
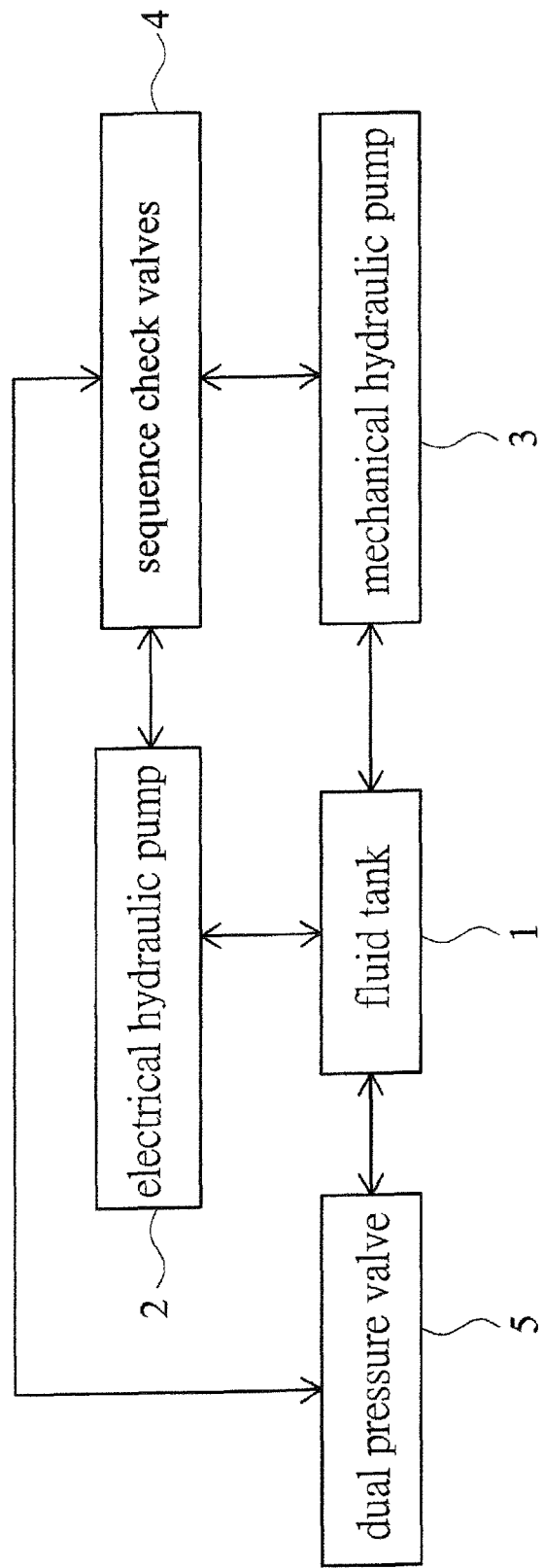
FIG. 1 is a schematic view showing an essential structure of the present invention.

Referring first to FIG. 1, which is a schematic view showing an essential structure of the present invention, as shown in the drawing, the present invention provides a bidirectional output mixed hydraulic power system, which comprises at least a fluid tank 1, at least one electrical hydraulic pump 2, at least one mechanical hydraulic pump 3, at least two sequence check valves 4, and a dual pressure valve 5.

The fluid tank 1 contains and stores therein a hydraulic fluid.

The electrical hydraulic pump 2 is connected to the fluid tank 1 and the electrical hydraulic pump 2 is coupled to a motor 21. The motor 21 is operable to drive the electrical hydraulic pump 2 in either the clockwise direction or the counterclockwise direction so as to make the electrical hydraulic pump 2 draw in, pressurize, and output the hydraulic fluid contained in the fluid tank 1.

The mechanical hydraulic pump 3 is connected to the fluid tank 1 to draw in, pressurize, and output the hydraulic fluid contained in the fluid tank 1.

Each of the sequence check valves 4 is connected to the electrical hydraulic pump 2 and the mechanical hydraulic pump 3. Each of the sequence check valves 4 is set in a normally open condition in a first direction (the direction toward the electrical hydraulic pump 2) and is in a non-returning condition in a second direction (the direction toward the mechanical hydraulic pump 3).

The dual pressure valve 5 is connected to the fluid tank 1 and each of the sequence check valves 4 for switching the output direction of hydraulic fluid.

Figure 2:
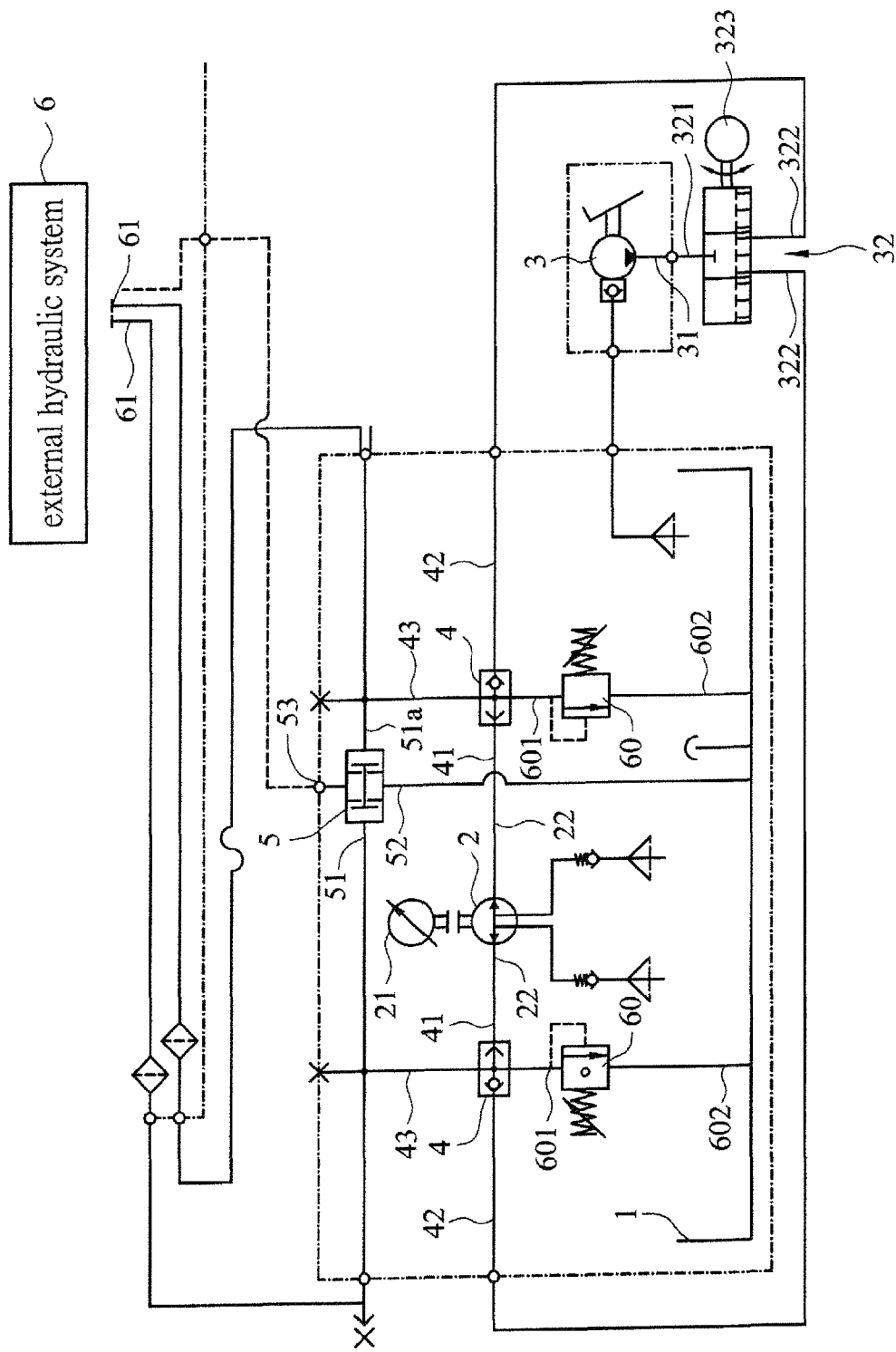
FIG. 2 is a schematic view illustrating an operation condition of the present invention.
Figure 3:
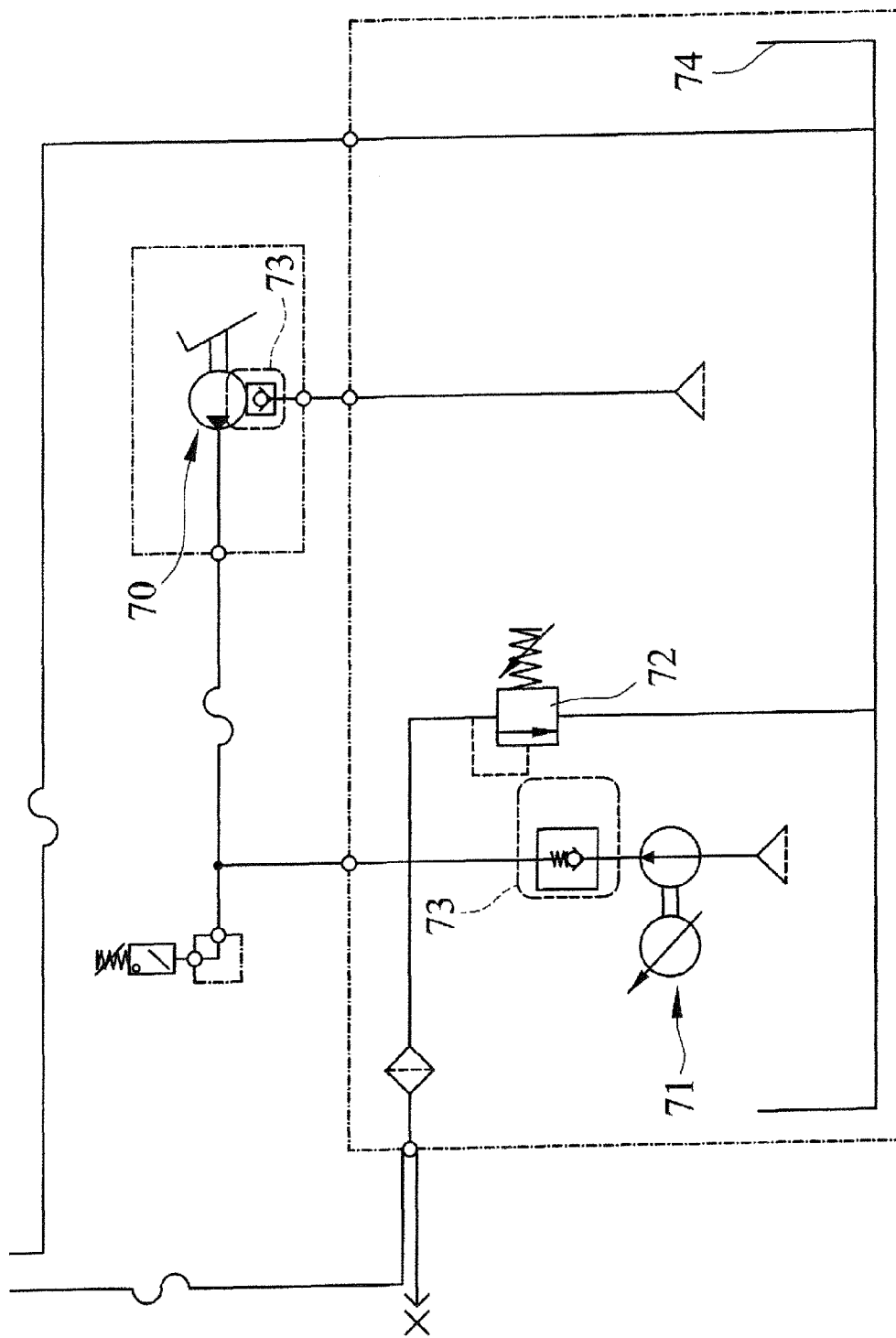
FIG. 3 is a schematic view illustrating an operation condition of a conventional device.
Figure 4:
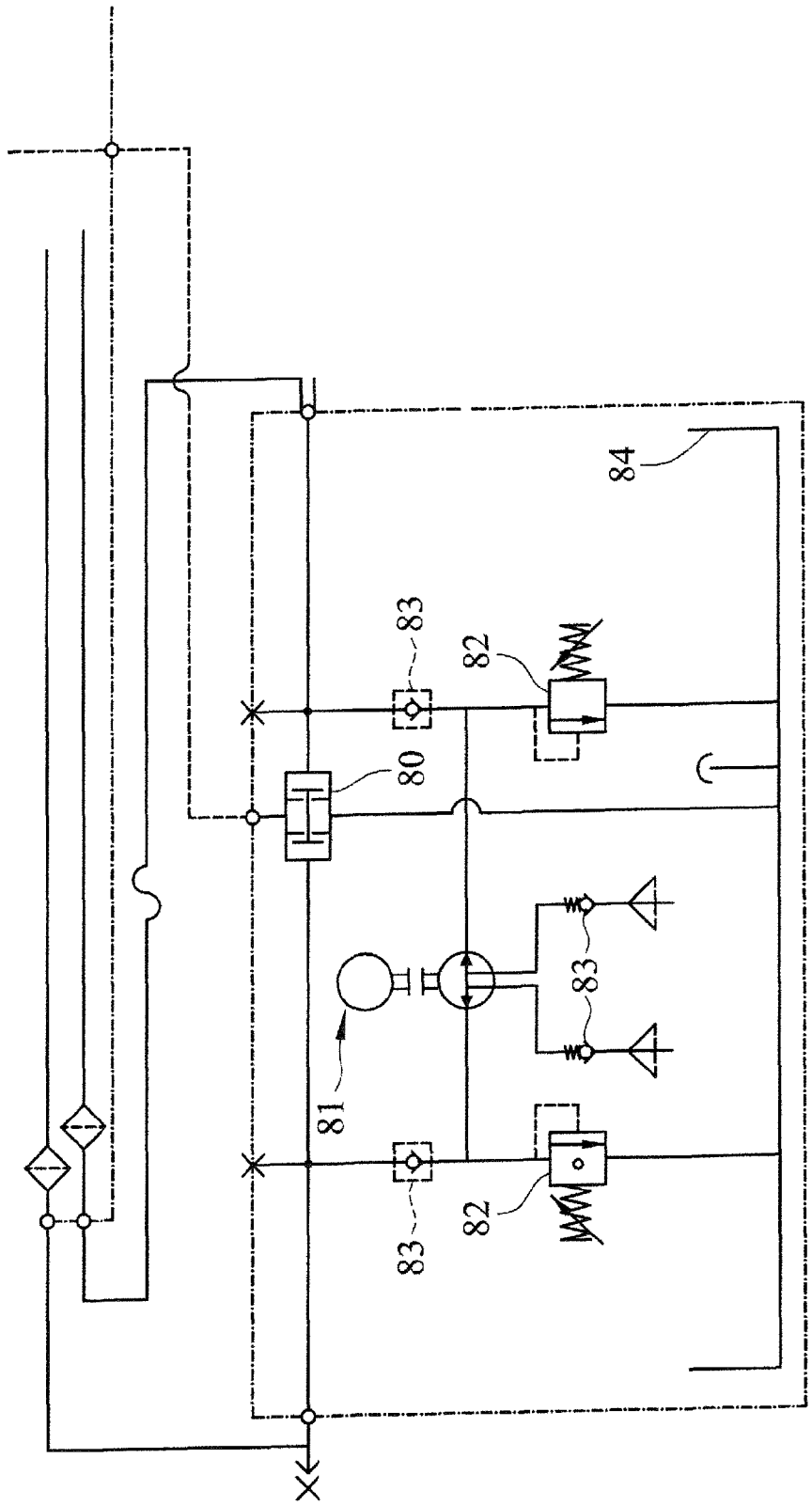
FIG. 4 is a schematic view illustrating an operation condition of another conventional device.

Referring to FIG. 2, a schematic view is given to illustrate an operation condition of the present invention. As shown in the drawing, the electrical hydraulic pump 2 of the present invention comprises at least two electrical hydraulic pump fluid outlets 22 in different directions. The mechanical hydraulic pump 3 at least comprises a mechanical hydraulic pump outlet 31. The dual pressure valve 5 at least comprises a dual pressure valve first fluid inlet 51, a dual pressure valve second fluid inlet 51a, and a fluid return port 52. The electrical hydraulic pump fluid outlets 22, the mechanical hydraulic pump outlet 31, and the dual pressure valve first fluid inlet 51 and the dual pressure valve second fluid inlet 51a are respectively connected to the sequence check valves 4. The fluid return port 52 of the dual pressure valve 5 is connected to the fluid tank 1. Each of the sequence check valves 4 comprises a first fluid inlet 41 connected to the respective one of the electrical hydraulic pump fluid outlets 22, a second fluid inlet 42 connected to the mechanical hydraulic pump outlet 31, and a common fluid outlet 43 connected to respective one of the dual pressure valve first fluid inlet 51 and the dual pressure valve second fluid inlet 51a. The mechanical hydraulic pump 3 is further connected to a manually-operating direction-switching valve 32. The manually-operating direction-switching valve 32 comprises a direction-switching fluid inlet 321 connected to the mechanical hydraulic pump outlet 31, direction-switching fluid outlets 322 respectively connected to the second fluid inlets 42 of the sequence check valves 4, and a manually-operating controller 323 selectively connecting the direction-switching fluid outlets 322 to the direction-switching fluid inlet 321. The common fluid outlets 43 of the sequence check valves 4 and the dual pressure valve first fluid inlet 51 and the dual pressure valve second fluid inlet 51a of the dual pressure valve 5 are further connectable to an external hydraulic system 6. The external hydraulic system 6 comprises a system fluid port 61 connected to the common fluid outlets 43, the dual pressure valve first fluid inlet 51, and the dual pressure valve second fluid inlet 51a. The dual pressure valve 5 further comprises a system low-pressure fluid return port 53 that is connected to the external hydraulic system 6. The system low-pressure fluid return port 53 is connected to the fluid return port 52 of the dual pressure valve 5 to provide the external hydraulic system 6 with a passage for hydraulic fluid that leaks through clearance and gaps of components to flow back to the fluid tank 1. Further, the system fluid port 61 is connected to at least two pressure relief valves 60. Each of the pressure relief valves 60 comprises at least one pressure-relief inlet 601 connected to the system fluid port 61 and at least one pressure-relief outlet 602 connected to the fluid tank 1.

With the above connection according to the present invention completed, the fluid tank 1, the electrical hydraulic pump 2, the mechanical hydraulic pump 3, the manually-operating direction-switching valve 32, the sequence check valves 4, the dual pressure valve 5, the external hydraulic system 6, and the pressure relief valves 60 can be used in combination with the electrical hydraulic pump 2, the mechanical hydraulic pump 3, and the manually-operating direction-switching valve 32 to carry out a desired operation, during which for example the sequence check valves 4 are kept in such a way that when the mechanical hydraulic pump 3 is not in operation, the first fluid inlets 41 are set normally open in the direction toward the electrical hydraulic pump 2, while fluid returning is prevented in the direction toward the mechanical hydraulic pump 3 so that the first fluid inlets 41 are respectively kept in communication with the common fluid outlets 43 and no accumulation of pressure may occur, allowing the electrical hydraulic pump 2 to operate for output. Oppositely, when the mechanical hydraulic pump 3 is inputted with power for operation, the first fluid inlets 41 are closed and the second fluid inlets 42 are respectively set in communication with the common fluid outlets 43, preventing fluid returning in the direction of the sequence check valve 4 toward the electrical hydraulic pump 3, wherein each of the sequence check valves 4 is provided therein with an elastic element so that when the mechanical hydraulic pump 3 is not in operation, the elastic element makes the first fluid inlet 41 normally open.

Further, when the hydraulic fluid is outputted in the first direction (namely the left side of the electrical hydraulic pump 2 in FIG. 2), the dual pressure valve 5 is activated in such a way that that the dual pressure valve first fluid inlet 51 of the dual pressure valve 5 is closed and the dual pressure valve second fluid inlet 51a is open and the hydraulic fluid, when outputted to the external fluid passage, flows back through the dual pressure valve second fluid inlet 51a to form a complete loop, whereby when the output direction of the hydraulic fluid is to be changed, the opening direction of the dual pressure valve first fluid inlet 51 and the dual pressure valve second fluid inlet 51a of the dual pressure valve 5 is switched to allow the direction of hydraulic output to be changed.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. A bidirectional output mixed hydraulic power system, comprising:
   a fluid tank, which contains and stores a hydraulic fluid;
   at least one electrical hydraulic pump, which is connected to the fluid tank to draw in, pressurize, and output the hydraulic fluid;
   at least one mechanical hydraulic pump, which is connected to the fluid tank to draw in, pressurize, and output the hydraulic fluid;
   at least two sequence check valves, each of which is connected to the electrical hydraulic pump and the mechanical hydraulic pump, each of the sequence check valve being set in a normally open condition in a first direction and in a non-returning condition in a second direction; and
   a dual pressure valve, which is connected to the fluid tank and each of the sequence check valves for switching output direction of the hydraulic fluid;
   wherein the electrical hydraulic pump comprises at least two electrical hydraulic pump fluid outlets in different directions, the mechanical hydraulic pump at least comprising a mechanical hydraulic pump outlet, the dual pressure valve at least comprises dual pressure valve fluid inlets and a fluid return ports, the electrical hydraulic pump fluid outlets, the mechanical hydraulic pump outlet, and the dual pressure valve fluid inlets being respectively connected to the sequence check valves, the fluid return port of the dual pressure valve being connected to the fluid tank, each of the sequence check valves comprises a first fluid inlet connected to the respective one of the electrical hydraulic pump fluid outlets, a second fluid inlet connected to the mechanical hydraulic pump outlet, and a common fluid outlet connected to respective one of the dual pressure valve first fluid inlets, the mechanical hydraulic pump is further connected to a manually-operating direction-switching valve, the manually-operating direction-switching valve comprising a direction-switching fluid inlet connected to the mechanical hydraulic pump outlet, direction-switching fluid outlets respectively connected to the second fluid inlets of the sequence check valves, and a manually-operating controller selectively connecting the direction-switching fluid outlets to the direction-switching fluid inlet.

2. The bidirectional output mixed hydraulic power system according to claim 1, wherein the electrical hydraulic pump is coupled to a motor and the motor is operable to drive the electrical hydraulic pump in either the clockwise direction or the counterclockwise direction.

3. The bidirectional output mixed hydraulic power system according to claim 1, wherein the sequence check valves are kept in such a way that when the mechanical hydraulic pump is not in operation, the first fluid inlets are set normally open so that the first fluid inlets are respectively in communication with the common fluid outlets; while when the mechanical hydraulic pump is in operation, the first fluid inlets are closed and the second fluid inlets in respectively in communication with the common fluid outlet.

4. The bidirectional output mixed hydraulic power system according to claim 1, wherein each of the sequence check valves is provided therein with an elastic element so that when the mechanical hydraulic pump is not in operation, the elastic element makes the first fluid inlet normally open.

5. The bidirectional output mixed hydraulic power system according to claim 1, wherein the common fluid outlets of the sequence check valves and the dual pressure valve fluid inlets of the dual pressure valve are further connectable to an external hydraulic system.

6. The bidirectional output mixed hydraulic power system according to claim 5, wherein the external hydraulic system comprises a system fluid port connected to the common fluid outlets and the dual pressure valve fluid inlets.

7. The bidirectional output mixed hydraulic power system according to claim 5, wherein the dual pressure valve further comprises a system low-pressure fluid return port that is connected to the external hydraulic system, the system low-pressure fluid return port being connected to the fluid return port of the dual pressure valve to provide the external hydraulic system with a passage for hydraulic fluid that leaks through clearance and gaps of components to flow back to the fluid tank.

8. The bidirectional output mixed hydraulic power system according to claim 6, wherein the system fluid port is connected to at least two pressure relief valves, each of the pressure relief valves comprising at least one pressure-relief inlet connected to the system fluid port and at least one pressure-relief outlet connected to the fluid tank.

\* \* \* \* \*